A. WOLLENSAK.
FISHING REEL.
APPLICATION FILED MAR. 9, 1910.

969,235.                                         Patented Sept. 6, 1910.

Witnesses:
G. W. Carroll
D. Gurnee

Inventor:
Andrew Wollensak
by
Osgood Davis Morey
his attorneys

UNITED STATES PATENT OFFICE.

ANDREW WOLLENSAK, OF ROCHESTER, NEW YORK, ASSIGNOR TO WOLLENSAK OPTICAL COMPANY, OF ROCHESTER, NEW YORK, A CORPORATION OF NEW YORK.

FISHING-REEL.

969,235.  Specification of Letters Patent.  Patented Sept. 6, 1910.

Application filed March 9, 1910. Serial No. 548,297.

*To all whom it may concern:*

Be it known that I, ANDREW WOLLENSAK, a citizen of the United States, and resident of Rochester, in the county of Monroe and State of New York, have invented certain new and useful Improvements in Fishing-Reels, of which the following is a specification.

This invention relates to fishing reels. Its object is to produce a simple construction of few parts that will enable both the click and drag to be operated by a single lever.

Figure 1:
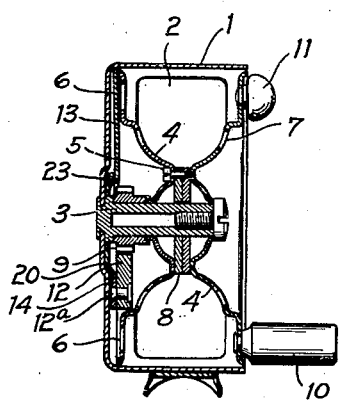
Figure 2:
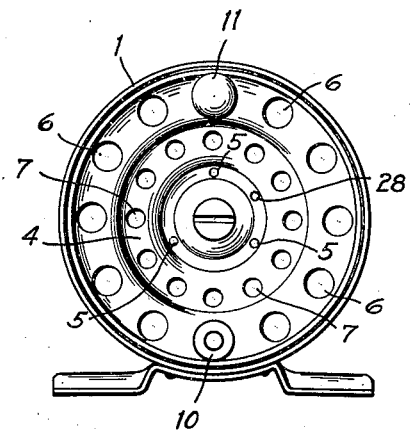
Figure 3:
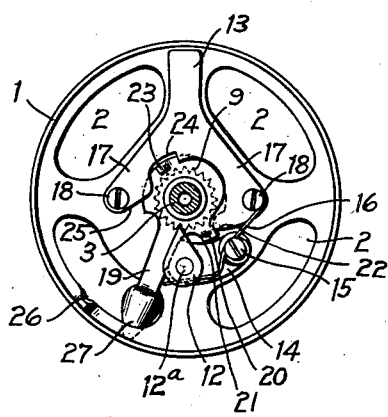
Figure 4:
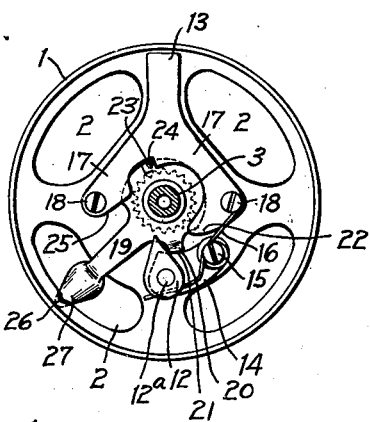
Figure 5:
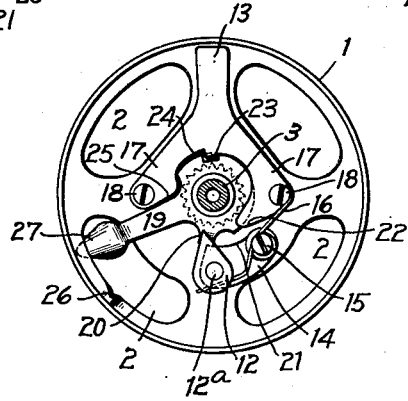

In the drawings:—Figure 1 is a central vertical section of the reel; Fig. 2 is a side elevation; Figs. 3, 4, and 5 are end views of the frame of the reel looking in the same direction as in Fig. 2, and show the mechanism in its different operative positions.

The frame of the illustrated reel comprises a shell or case 1, which is preferably stamped from a single piece of metal into the cup-shaped form shown in the drawings, with portions of the metal removed at intervals to produce openings 2, both in its circumferential face and back, so that a skeleton form is produced that is light and at the same time sufficiently strong.

The shell 1 contains a spindle 3, centrally located, that is adapted to receive the spool. This spool is represented as constructed from two cup-shaped metal disks 4, 4, that are screwed together, back to back, at 5, and are ventilated by perforations 6 and 7, the space between the disks being sufficient to accommodate the windings of the line. The spool thus formed has a central hub 8 that fits the spindle 3, and also carries a pinion 9. It has also an operating handle 10 and counterweight 11.

The click 12 and drag 13 are located inside the shell 1, adjacent to the spindle 3. The click 12 is a pawl that is supported by a pivot 12ª on a lever 14 that in turn is pivoted to the shell at 15. A spring 16 tends normally to hold the click in engagement with the pinion 9, by both swinging the lever inwardly and holding the pawl in position with reference to the pinion.

The drag 13 is a spring metal piece, whose outer end is free and normally lies close to the shell 1 to which it is secured at a point adjacent to the spindle, as by legs 17, 17, and screws 18, 18.

Both click and drag are operated by a single lever 19 that is pivoted within the shell on the spindle 3, and protrudes through one of the openings 2. The click is operated by an arm or projection 20 on the operating lever 19 that engages the inner edge 21 of the pawl-carrying lever 14, and this edge is so curved that when the projection is in the position shown in Fig. 3, where it lies against a stop 22 on the drag, the pawl-carrying lever is free to swing the pawl into engagement with the pinion 9, and so put on the click. But when the operating lever is moved into either its other extreme position shown in Fig. 5, or its intermediate position shown in Fig. 4, the projection 20 holds the pawl-carrying lever 14 back so that the pawl is out of engagement with the pinion 9. Another arm of the operating lever 19 carries a wedge 23 that is adapted to slide beneath the drag 13 at a point that lies radially out beyond its attachment to the shell 1, and so spring the drag inwardly into engagement with the spool. In the construction shown the wedge 23 is formed by slitting the metal piece that constitutes the operating lever, and bending up a portion of it. A recess 24 in the plate from which the drag is formed accommodates the wedge 23 when the operating lever 19 is in the position that puts the click on (see Fig. 3), or in its intermediate position (see Fig. 4).

A shoulder 22 on one leg 17 of the drag 1 engages the projection 20 on the operating lever and so serves as a stop to limit the movement of the operating lever in the direction which releases the drag, and permits the pawl to move under the tension of its spring, into engagement with the pinion, (see Fig. 3) as stated above. A shoulder 25 on the other leg 17 of the drag engages the operating lever itself when moved into the other extreme position of the operating lever in the opposite direction, in which the pawl is withheld from the pinion and the drag is on. An indentation 26 in the shell 1 arrests the head 27 of the operating lever in the intermediate position of said lever, since said lever is resilient and is bent outwardly by its contact with the outer surface of said shell.

The hole 28 in the spool, near its hub, is intended for fastening the line to the spool by passing it through said hole and knotting it.

What I claim is:—

1. In a reel, the combination of a frame whose back is perforated; a spool revolubly supported thereby; a retarding device for the spool, attached to the inside of the back of the frame; and a lever pivoted on the inside of the back of the frame adapted to operate the retarding device, and having a resilient operating arm that is sprung outwardly through the perforation in the back of the frame and projects radially beyond it.

2. In a reel, the combination of a frame consisting of a shell, open in front, having a slot in its back, and having a spindle diametrically located within it; a spool adapted to revolve on the spindle; a retarding device for the spool, attached to the inside of the back of the frame; and a lever pivoted on the inside of the back of the frame, adapted to operate the retarding device, and having a resilient operating arm that projects laterally through and is movable in the slot.

ANDREW WOLLENSAK.

Witnesses:
C. S. DAVIS,
D. GURNEE.